United States Patent
Terracciano et al.

(10) Patent No.: US 12,276,606 B2
(45) Date of Patent: Apr. 15, 2025

(54) ULTRA-SPECTRALLY SELECTIVE TERAHERTZ BAND STOP REFLECTOR

(71) Applicant: University of Central Florida Research Foundation, Inc., Orlando, FL (US)

(72) Inventors: Anthony C. Terracciano, Orlando, FL (US); Christopher Arose, Orlando, FL (US); Subith Vasu, Orlando, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 652 days.

(21) Appl. No.: 17/456,493

(22) Filed: Nov. 24, 2021

(65) Prior Publication Data
US 2022/0236177 A1    Jul. 28, 2022

Related U.S. Application Data

(60) Provisional application No. 63/142,078, filed on Jan. 27, 2021.

(51) Int. Cl.
*G01N 21/3581* (2014.01)
*G01B 11/06* (2006.01)

(52) U.S. Cl.
CPC ..... *G01N 21/3581* (2013.01); *G01B 11/0625* (2013.01)

(58) Field of Classification Search
CPC .......... G01N 21/3581; G01B 11/0625
See application file for complete search history.

(56) References Cited

U.S. PATENT DOCUMENTS

2015/0034592 A1 *  2/2015  Huff ............... C03C 15/00
                                                    216/41

FOREIGN PATENT DOCUMENTS

| CN | 105896098 A | * | 8/2016 | ............ H01Q 17/00 |
| CN | 110071372 A | * | 7/2019 | |
| JP | 2018031896 A | * | 3/2018 | |

OTHER PUBLICATIONS

Cunningham et al., Terahertz frequency range band-stop filters. Appl. Phys. Lett. 2005. vol. 86: 213503.
Zhai et al., A High-Selectivity THz Band-Stop Filter Based on a Flexible Polymide Film. Proc. SPIE. 2018: 10826.

(Continued)

*Primary Examiner* — Michelle M Iacoletti
*Assistant Examiner* — Omar H Nixon
(74) *Attorney, Agent, or Firm* — Owen G. Behrens; Smith & Hopen, P.A.

(57) ABSTRACT

A device configured to inhibit the reflectance of electromagnetic radiation in the terahertz (THz) frequency range. This characterization is a combination of material and geometric parameters which are unique and tunable enabling resonating frequencies (spectral selectivity) in the THz range (0.1-25) with narrow channel widths (FWHM) controllable by the thickness and electrical properties of the crystalline material. This device may be integrated with broadband sources or co-integrated with other analytical detection methods (e.g., chromatography, Fourier Transform Reflectance Spectroscopy).

17 Claims, 12 Drawing Sheets

(56) References Cited

OTHER PUBLICATIONS

Goldsmith et al., Long-wave infrared selective pyroelectric detector using plasmonic near-perfect absorbers and highly oriented aluminum nitride. J. Opt. Soc. Am. B. 2017. vol. 34 (No. 9): 1965-1970.
Nath et al., Far-infrared absorber based on standing-waveresonances in metal-dielectric-metal cavity. Optics Express. 2015. vol. 23 (No. 16): 1-15.
Wang et al., Theoretical Investigation of Broadband and Wide-Angle Terahertz Metamaterial Absorber. IEEE Photonics Technology Letters. 2014. vol. 26 (No. 2): 111-114.
Dao et al., Hole Array Perfect Absorbers for Spectrally Selective Midwavelength Infrared Pyroelectric Detectors. ACS Photonics. 2016. vol. 3: 1271-1278.
Arose et al., Far-infrared spectrally selective $LiTaO_3$ and AlN pyroelectric detectors using resonant subwavelength metal surface structures. MRS Advances. 2020. vol. 5: 1-7.

\* cited by examiner

ULTRA-SPECTRALLY SELECTIVE TERAHERTZ BAND STOP REFLECTOR

CROSS-REFERENCE TO RELATED APPLICATIONS

This nonprovisional application claims the benefit of provisional patent application No. 63/142,078, entitled "Ultra-spectrally selective THz band stop reflector," filed on Jan. 27, 2021, which shares inventorship with this application, the entirety of which is incorporated herein by reference.

FEDERALLY SPONSORED RESEARCH OR DEVELOPMENT

This invention was made with Government support under Agency Contract number D18AP00040 awarded by the Defense Advanced Research Projects Agency (DARPA). The Government has certain rights in this invention.

BACKGROUND OF THE INVENTION

1. Field of the Invention

This invention relates, generally, to a band stop reflector. More specifically, it relates to an ultra-spectrally selective terahertz (THz) band stop reflector.

2. Brief Description of the Prior Art

The terahertz (THz) region of the electromagnetic spectrum (0.1 THz to 10 THz; see FIG. 1) has applications in imaging, telecommunications, and spectroscopy. Recent publications have abounded for the filling of the "THz Gap", with detectors and sources being of high interest [1-3]. With the recent push to close the "THz gap" with sources and detectors that operate in this range, the need will naturally arise for spectral filters and wavelength absorbers to operate within the THz region. For example, many optical designs may be enhanced using selectively resonating cavities, spectrally selective mirrors, and other devices. Spectral filtering has a plethora of applications, from mitigation of unwanted signals and reduction of noise in spectroscopy and detectors to building highly monochromatic laser systems [4-6]. Resonant absorbers are needed to enable wavelength selective thermal detectors, including pyroelectric, thermo-pile, and bolometer types [7]. However, polarization and incident angle insensitivity would be advantageous in waveguide systems, which have not been produced to date.

Attempts have been made to utilize frequency selective surfaces comprising arrays of sub-wavelength resonant structures. Frequency selective surfaces that provide bandstop filtering have taken many forms as applied to radio and infrared (IR) frequencies [8-14]. These surfaces include Salisbury screens, split ring resonators (SRRs), metal patches, and hole arrays in otherwise continuous metal films. Plasmonic resonances are used to create spectrally selective absorbers in films of negligible thickness compared to transverse structure dimensions, which are themselves smaller than the operating wavelength [17-19]. The absorbers may be considered as either as a metamaterial (an engineered surface of negligible thickness comparative to other dimensions) with effective optical constants or as a collection of independent resonators. Geometry and material properties define the resonances. These absorbers can be used to create spectrally selective thermal detectors [20-23] such as pyroelectrics and bolometers. However, the attempts to create absorber designs to date are asymmetric, which causes absorption to depend on polarization and incidence angle [14-16].

Accordingly, what is needed is an ultra-spectrally selective terahertz (THz) band stop reflector that includes absorption bands that are independent of an incidence angle and polarization. However, in view of the art considered as a whole at the time the present invention was made, it was not obvious to those of ordinary skill in the field of this invention how the shortcomings of the prior art could be overcome.

All referenced publications are incorporated herein by reference in their entirety. Furthermore, where a definition or use of a term in a reference, which is incorporated by reference herein, is inconsistent or contrary to the definition of that term provided herein, the definition of that term provided herein applies and the definition of that term in the reference does not apply.

While certain aspects of conventional technologies have been discussed to facilitate disclosure of the invention, Applicant in no way disclaims these technical aspects, and it is contemplated that the claimed invention may encompass one or more of the conventional technical aspects discussed herein.

The present invention may address one or more of the problems and deficiencies of the prior art discussed above. However, it is contemplated that the invention may prove useful in addressing other problems and deficiencies in a number of technical areas. Therefore, the claimed invention should not necessarily be construed as limited to addressing any of the particular problems or deficiencies discussed herein.

In this specification, where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

BRIEF SUMMARY OF THE INVENTION

The long-standing but heretofore unfulfilled need for an ultra-spectrally selective terahertz (THz) band stop reflector is now met by a new, useful, and nonobvious invention.

The novel THz band stop reflector includes a substrate having a top surface opposite a bottom surface. The substrate has a thickness measured from the top surface to the bottom surface of between 10 nm and 1 mm. In an embodiment, the substrate has a thickness of 500 µm. In an embodiment, the substrate is made of a fused silica material.

The reflector includes a top coating applied to the top surface of the substrate. The top coating is an absorber layer having high conductivity and includes a conductive element disposed thereon. The conductive element includes a conductive region that is surrounded by an absence region that is configured to enable the propagation of THz bands therethrough. In an embodiment, the absorber layer has a thickness of 100 nm. In an embodiment, the conductive elements of the absorber layer is made of a titanium/gold metamaterial.

The reflector also includes a bottom coating applied to the bottom surface of the substrate. The bottom coating is a backplane layer having high conductivity. In an embodiment, the backplane layer has a thickness of 100 nm. In an embodiment, the backplane layer is made of a titanium/gold metamaterial.

An embodiment of the absorber layer includes a conductive region that is shaped as a cross having two perpendicularly intersecting sections that are equal in area and that each intersect at a midpoint of an opposing intersecting section. In an embodiment, a width of each of the two perpendicularly intersecting sections is between 2 μm and 4.5 μm. In an embodiment, a width of the defined absence region surrounding the conductive element is between 2.5 μm and 4 μm.

An embodiment of the absorber layer includes a plurality of conductive elements disposed thereon. In an embodiment, each conductive region is shaped as a cross having two perpendicularly intersecting sections that are equal in area and that each intersect at a midpoint of an opposing intersecting section. In an embodiment, the plurality of conductive elements are arranged in a consistent pattern, such that each of the plurality of conductive elements is spaced apart from adjacent conductive elements by an equal distance that defines a periodicity of the plurality of conductive elements. In an embodiment, the periodicity of the plurality of conductive elements is between 25 μm and 45 μm. In an embodiment, the consistent pattern of the plurality of conductive elements includes a cumulative area of 360 $mm^2$.

An embodiment of the reflector includes a plurality of layers each including a substrate, a top coating, and a bottom coating forming the reflector. In an embodiment, a top layer of the plurality of layers includes an absence region of the top coating having a first area, and a bottom layer of the plurality of layers includes an absence region of the top coating having a second area, with the first area being greater than the second area, thereby enhancing a tuning capacity for attenuation of the THz bands therethrough.

An object of the invention is to provide a THz band stop reflector that includes absorption bands that are independent of an incidence angle and polarization, such as for use in the detection of illicit organic substances by law enforcement, astronomy and military imaging, container screening, radar cloaking, phototherapy applications, and telecommunications, among other applications.

These and other important objects, advantages, and features of the invention will become clear as this disclosure proceeds.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

For a fuller understanding of the invention, reference should be made to the following detailed description, taken in connection with the accompanying drawings, in which.

DETAILED DESCRIPTION OF THE INVENTION

Figure 1:
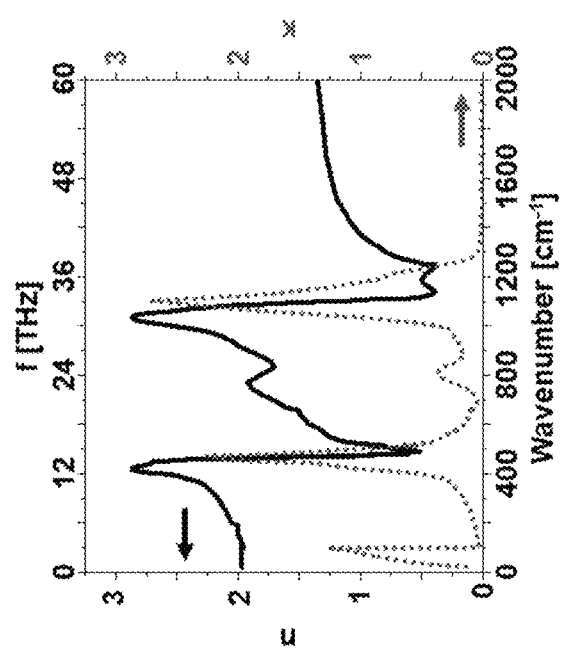
FIG. 1 is a graph illustrating Fused silica optical propagation properties in the THz to Mid-IR range [16].

In the following detailed description of the preferred embodiments, reference is made to the accompanying drawings, which form a part thereof, and within which are shown by way of illustration specific embodiments by which the invention may be practiced. It is to be understood that other embodiments may be utilized, and structural changes may be made without departing from the scope of the invention.

As used in this specification and the appended claims, the singular forms "a," "an," and "the" include plural referents unless the content clearly dictates otherwise. As used in this specification and the appended claims, the term "or" is generally employed in its sense including "and/or" unless the context clearly dictates otherwise.

The phrases "in some embodiments," "according to some embodiments," "in the embodiments shown," "in other embodiments," and the like generally mean the particular feature, structure, or characteristic following the phrase is included in at least one implementation. In addition, such phrases do not necessarily refer to the same embodiments or different embodiments.

All numerical designations, including ranges, are approximations which are varied up or down by increments of 1.0 or 0.1, as appropriate. It is to be understood, even if it is not always explicitly stated that all numerical designations are preceded by the term "about." As used herein, "about" or "approximately" refers to being within an acceptable error range for the particular value as determined by one of ordinary skill in the art, which will depend in part on how the value is measured or determined. As used herein, the term "about" refers to ±10% of the numerical; it should be understood that a numerical including an associated range with a lower boundary of greater than zero must be a non-zero numerical, and the term "about" should be understood to include only non-zero values in such scenarios.

The present invention includes an ultra-spectrally selective THz band stop reflector. Metamaterials, or engineered surfaces, often utilize plasmonic resonances to enable spectrally selective absorbers. The present invention uses these devices for narrow-band spectral filters by applying a metamaterial to a substrate with limited absorption features at predetermined wavelengths.

In some embodiments, the present invention is able to inhibit the reflectance of electromagnetic radiation in the THz frequency range. This characterization is a combination of material and geometric parameters which are unique and tunable enabling resonating frequencies (spectral selectivity) in the THz range with narrow channel widths (full width at half maximum values, or FWHM) controllable by the thickness and electrical properties of the crystalline material. This device may be integrated with broadband sources or co-integrated with other analytical detection methods (e.g., chromatography, Fourier Transform Reflectance Spectroscopy).

An embodiment of the narrow-band spectral filter has a unique geometry that utilizes a thin wafer substrate (approximately 10 nm<h<1 mm) of crystalline (mono, or poly) material, or flexible polymer film, which may or may not have sharp characteristic features in its permittivity over the frequency ranges of interest. A high conductivity coating is then applied to the top and bottom surfaces. These coatings provide two primary features: (1) the conductive nature of the coating enables electrical charge distribution; and (2) the geometric openings which are regularly spaced patterns enable impedance matching with an electromagnetic wave propagating in a dissimilar medium.

Figure 2:
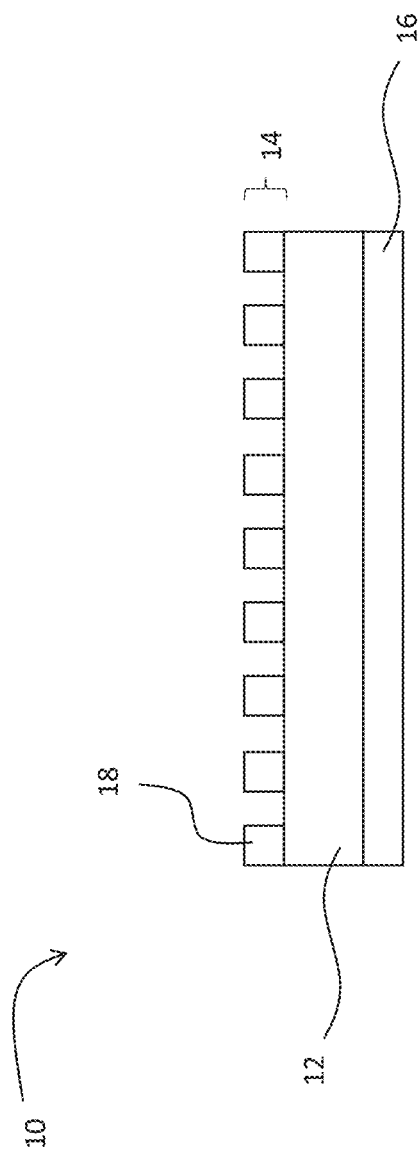
FIG. 2 is an elevation view of an embodiment of the layers of the filter.

As shown in FIG. 2, an embodiment of the narrow-band spectral filter 10 includes a fused silica substrate 12 sandwiched between an absorber layer 14 (the top coating) and a backplane layer 16 (the bottom coating). Fused silica was initially selected as the substrate 12 because it has no absorption features of its own below 450 cm$^{-1}$ (13.5 THz) and no inherent refractive index variations in the sub 5 THz range (see FIG. 1) [16]. Thus, validation of the filter 10 could be readily determined during testing. However, it should be understood that alternative substrates with different absorption properties may be used depending on the desired boundaries of the spectral filter. In addition, the tested substrate 12 has a thickness of 500 μm; however, this thickness can be adjusted to modify the properties of the filter 10.

Figure 3:
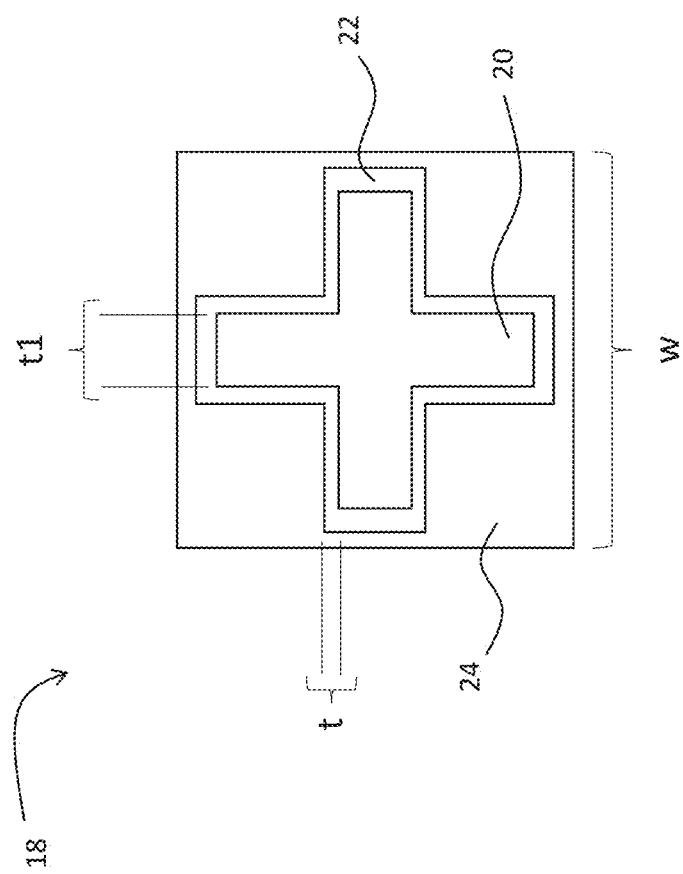
FIG. 3 is top plan view of an embodiment of the metamaterial design used within the filter of FIG. 2.
Figure 4:
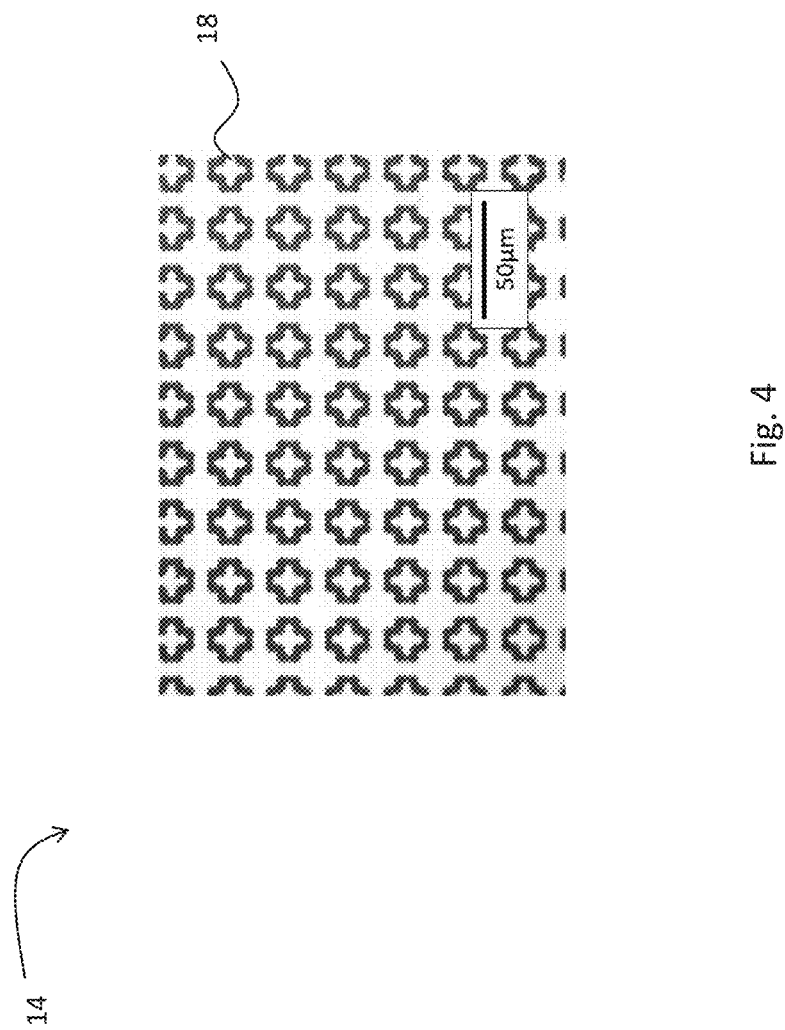
FIG. 4 is a micrograph of an embodiment of the filter of FIG. 2 including the metamaterial design shown in FIG. 3.

The absorber layer 14 includes of a plurality of equidistantly spaced conductive elements 18 comprised of metamaterial. The conductive elements 18, and particularly the conductive components 20 of the conductive elements 18, have a distinct pattern as depicted in FIGS. 3-4. In some embodiments, the distinct pattern is generally shaped like a cross or + shape; a pattern including superimposed crosses atop each other to form a # shape may also be considered. Referring to FIG. 3, the conductive component 20 of the conductive element 18 is surrounded by an absence region 22, with the conductive component 20 and the absence region 22 being disposed on a large continuous area 24. The planar width of the arms of the cross of the conductive component 20 are represented by t1, which can be a predetermined value between approximately 2 and 4.5 μm. The absence region 22 defines a distance, represented by t, between the conductive component 20 and the continuous area 24. That distance t can be a predetermined value between approximately 2.5 and 4 μm. Finally, the pattern has a periodicity represented by W. In some embodiments, the periodicity is between approximately 25 and 45 μm. As the periodicity of the metamaterial increases, the absorption frequency redshifts (i.e., decreases, with a corresponding increase in wavelength), as is expected from plasmonic structures.

In an embodiment, the pattern of the conductive elements 18 includes a periodically repeating arrangement of symmetrical square-shaped conductive elements to fill~360 mm$^2$ of the thin wafer substrate (an embodiment of which is shown in FIG. 4). The patterning is achieved by contact photolithography onto a dual sided polished (DSP) 500 μm thick (Z dimension) fused silica wafer, which will described in greater detail in the sections below.

Figure 5:
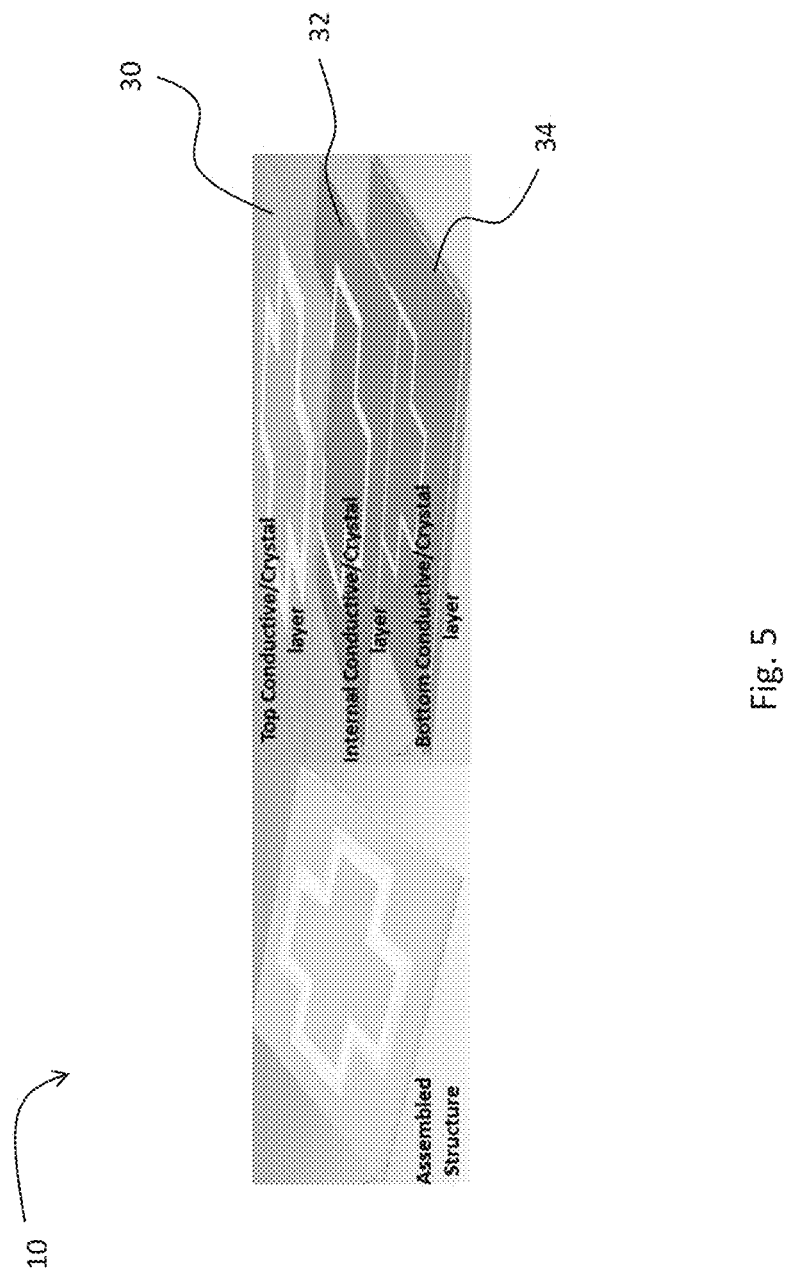
FIG. 5 is an exploded view of an embodiment of a substrate of the filter of FIG. 2 showing a plurality of layers.

Some embodiments of the narrow-band spectral filter 10, as exemplified in FIG. 5, include several filter layers. The depicted embodiment includes a top layer 30, an internal layer 32, and a bottom layer 34. Each filter layer includes a metamaterial (absorber layer 14) disposed on a substrate 12, as described above. As shown, in some embodiments, the absence region 22 for each absorber layer 14 becomes smaller moving from the top layer 30 to the internal layer 32, and from the internal layer 32 to the bottom layer 34. The progressively smaller absence regions 22 from the top layer 30 toward the bottom layer 34 enables the propagation of waves into the band stop layers to enable a larger tuning capacity for attenuation. The number of layers, the size of the absence region 22, and size of the conductive elements 18 impact the properties of the filter 10 and can therefore be tailored to achieve certain results, such as acting as very sharp filters.

The thickness of the metamaterial was tested at 100 nm; however, some embodiments may have different thicknesses depending on the intended properties of the filter 10. Some embodiments of the metamaterial have a thickness in a range of 1 nm to 3 mm. In addition, the tested metamaterial was Titanium/gold (Ti/Au); however, some embodiments of the metamaterial are comprised of different material depending on the intended properties of the filter 10. In various embodiments, the metamaterial may be metal, metalloids, structured dielectrics. However, the use of a structured dielectric, such as N or P doped silicon, impose unique characteristics to the filter 10 based on the intensity of the incident radiation.

The backplane is an electrically and thermally conductive material designed to reflect electromagnetic (EM) waves of predetermined wavelengths. The tested backplane was comprised of 100 nm thick Ti/Au. However, some embodiments of the backplane have different thicknesses depending on the intended properties of the filter 10. In addition, some embodiments of the metamaterial are comprised of different electrically conductive materials, including but not limited to Au, Cr, Ti, Ni, Cu, Co, Fe, Si, V, Rh, Ru, Mg, Ge, graphene, and ceramics thereof, depending on the intended properties of the filter 10.

Figure 6:
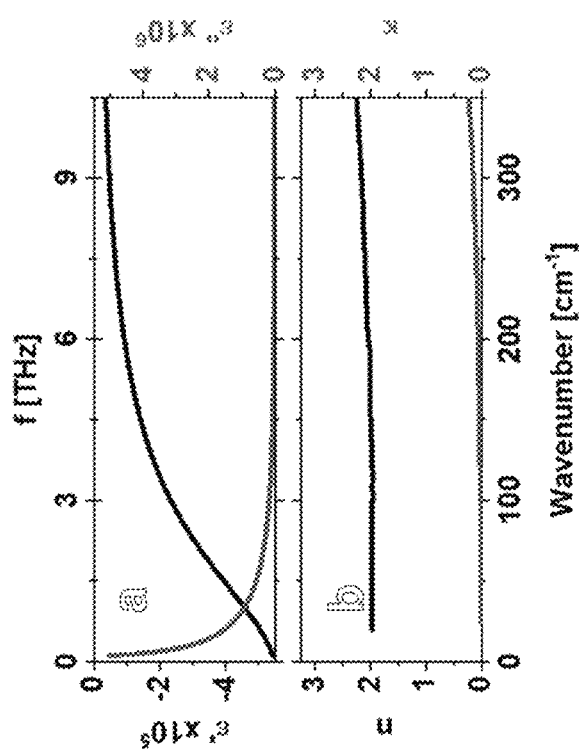
FIG. 6 graphically depicts the far-infrared complex permittivity spectrum for gold (shown in section A) and of the spectra for infrared index n and extinction coefficient κ for fused silica (shown in section B).

As shown in FIG. 6, the spectra for the infrared index n and extinction coefficient κ for fused silica [26] shows that there is a negligible variation of the infrared index below 6 THz. In particular, an extinction peak found at 2.8 THz gives no significant dispersion feature to the index spectrum. Dispersion features have been shown to give rise to unintended resonances [27]. Thus, any resonances below 6 THz are determined by the design geometry of the narrow-band spectral filter. In addition, FIG. 6 shows the far-infrared complex permittivity spectrum for gold with real and imaginary parts ε' and ε", respectively. As shown, no sharp features that might lead to parasitic resonances are present in the spectrum.

In some embodiments, the Q factor and wavelength center of the filter can be modified by biasing the electrical contacts at a specified potential enabling dynamic control of reflectivity.

In some embodiments, one or more of the present inventions can be integrated into a waveguide as part of an etalon.

Experimental Testing

Narrow-band far infrared (FIR) filters 10 were simulated via finite element analysis and subsequently manufactured using contact photolithography and e-beam metal deposition processes. Alternative methods of fabrication can also include but are not limited to screen printing, slip/tape casting, and laser etching. Manufactured filter performance was then quantitatively measured using Fourier transform infrared (FTIR) spectrometry. The filter 10 configuration consists of a fused silica wafer $(SiO)_x$-500 µm) substrate 12 with an electrically and thermally conductive backplane layer 16 (Ti/Au 100 nm) with a metamaterial absorber layer 14 (Ti/Au 100 nm) on the incident surface of the substrate 12. Attenuation of reflected signals was observed on the order of (−4.0)-(−7.2) dB seen between 50 and 200 $cm^{-1}$ (1.5 and 6 THz) with FWHM values of 20-56 $cm^{-1}$ (0.6-1.68 THz). Furthermore, a close agreement between simulation and measurements was observed.

The geometry of the metamaterial designs utilized in the tested filter 10 were fabricated using a previously published configuration first discussed in Arose et al. [3, 17]. The devices were patterned by contact photolithography onto dual sided polished (DSP) 500 µm thick fused silica wafer substrates 12 (FIG. 2). A backplane with thickness 100 nm was applied as a Ti sticking layer and Au overlayer to form the backplane layer 16. The metamaterial patterned layer thickness was also 100 nm and consisted of the same material for the absorber layer 14. All metal layers were deposited by e-beam evaporation. On each sample, a patterned area of 360 $mm^2$, was achieved and held constant during all subsequent experiments. This area corresponds to a minimum of 423 units in the metamaterial pattern, as pattern size shrinks with higher frequency the number of units increases.

Figure 12:
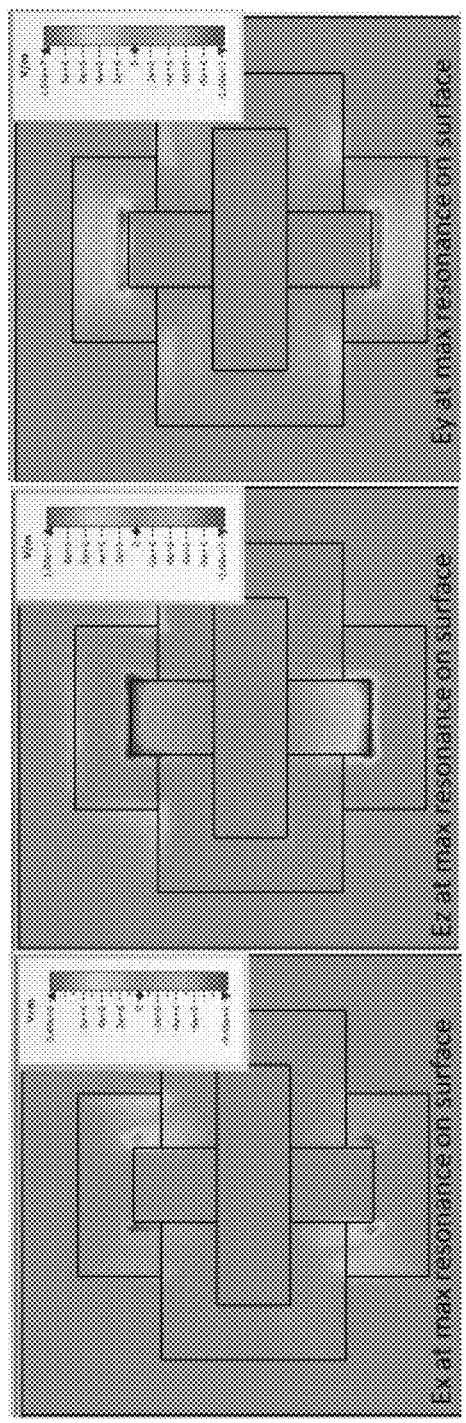
FIG. 12 graphically depicts the electrical characteristics of embodiments of the present invention, showing maximum resonance on a surface of embodiments of the filter patterns.

The definition of geometry and subsequent simulations of the reflector were conducted in a high frequency 3D simulation package utilizing finite element analysis (FEA) marketed under the trade name CST Studio Suite® 2019 (3DS Dassault Systems, Vélizy-Villacoublay, France). Au was simulated with a Drude fit model, and silica was simulated with a Lorentzian fit with property data obtained from Derkachova and Kitamura, respectively [15, 26]. Periodic boundary conditions were used in simulation with a minimum standoff distance of 25 µm between the object of interest and the Fairfield incident boundary Exy. At perpendicular planes, Eyz and Exz, a symmetric boundary was implemented (see FIG. 12).

Figure 7:
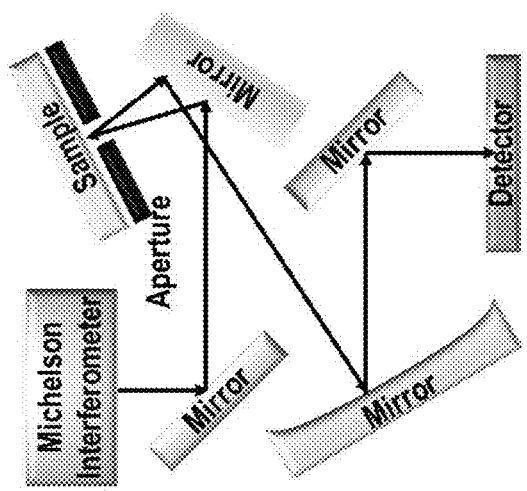
FIG. 7 depicts an embodiment of a beam path diagram of a reflectivity rig used for testing the filter of FIG. 2.

Reflectance spectra were obtained using a Michaelson Interformeter, (Bomem DA8) FTIR spectrometer (ABB Ltd, Zürich, Switzerland) at a resolution of 8 $cm^{-1}$ between data points. An aperture of 31.4 $mm^2$ was used within the optical system to ensure uniform illumination of sufficient pattern periods while avoiding the edges of the substrate. A 3×-beam condenser and spectral reflectance accessory (Perkin-Elmer) was used for measurements, with the beam being oriented toward the sample in a converging manner at near-normal incidence (approximately 8° deviation from normal). A diagram of an embodiment of the beam path can be seen in FIGS. 7, and 400-500 scan averages were taken for each sample to minimize the effect of noise from thermal sources. The variable angle reflectance accessory (Agilant Technologies) permitted incidence angles from 20° to 60°. A gold mirror was used for the reflectance reference. Reflectance was calculated as the ratio of sample to reference reflected power. A wire-grid on polyethylene far-IR polarizer was used for polarization studies.

Before each measurement, the maximum observed pressure within the FITR was 500±20 mTorr. Any air within the device would have been sourced from laboratory at 20±3° C. and indoor air relative humidity. Thus, a maximum water vapor concentration would be 1.06 $µmol/m^3$.

A nearest-neighbor averaging technique was implemented to mitigate the prominence of Fabry-Perot resonances; such averaging better indicated the presence of the sampling information available from the instrumentation.

Results

Figure 8:
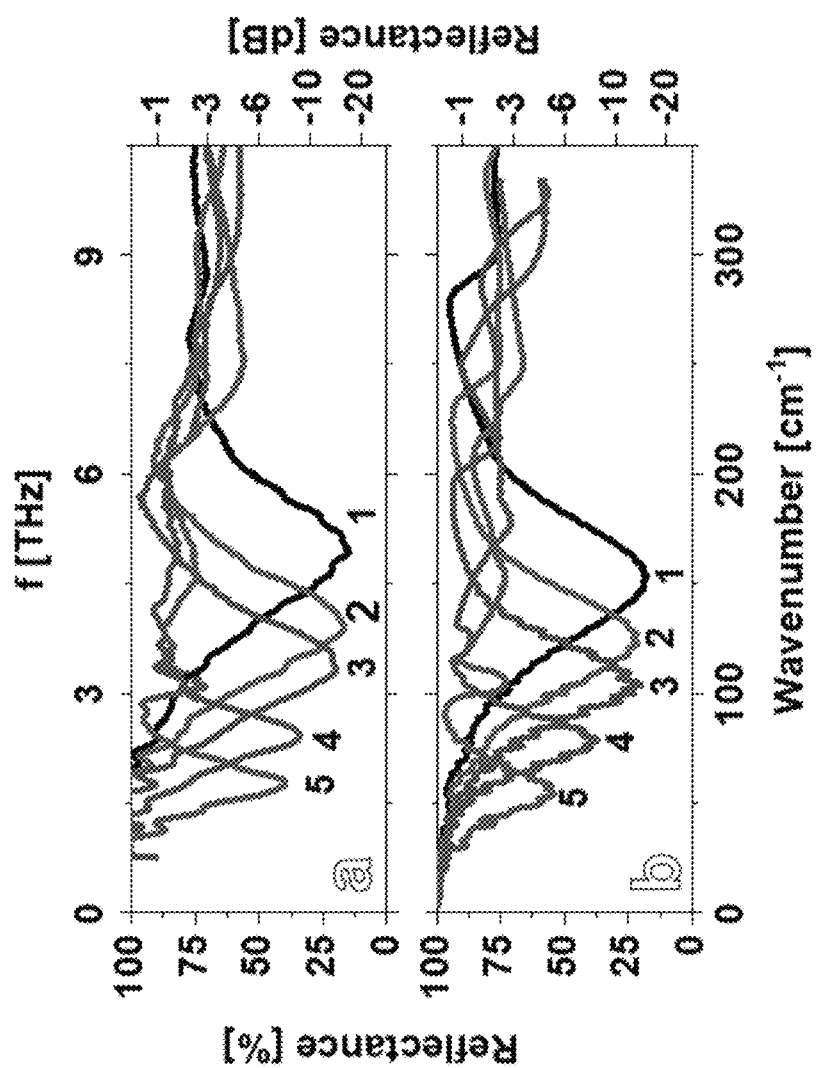
FIG. 8 graphically depicts unpolarized normal incidence reflectance spectra for measured results (shown in section A) simulation results (shown in section B) for tested filter patterns in five samples.

FIG. 8 graphically depicts the unpolarized simulated and measured reflectance spectra (R) at near-normal incidence for five tested samples, with geometrical parameter values provided in Table 1 below. Each sample is consistently defined as a given line color. As can be seen in FIG. 8 between the top plot shown in section A (measured results) and bottom plot shown in section B (simulated results), there is a good agreement between simulated and measured results, with the maximum difference in position of the minimum reflectance of a simulated and measured result being 8% (Sample 4). Furthermore, amplitude differences are on the order of 1 dB. From FIG. 1, no spurious resonances are expected for silica in this spectral range, so the observed features can be attributed to the pattern of the metamaterial layer and the coupling between the backplane and metamaterial. A measured minimum reflectance of 19% can be seen for sample 1, and a minimum reflectance of 40% is seen for sample 5, with all other samples' reflectance falling between these two values. This corresponds to an attenuation of −17 dB for sample 1, and −8.5 dB for sample 5. The Q factor for each sample can be seen in Table 1. All Q=f/Δf values are above ½, which indicates that these resonators are underdamped, as desired for high selectivity. These observed attenuations can be tuned by controlling the material thickness. A thinner layer of silica will lead to less scattering loss in the material, and thus deepen the absorption features [3].

TABLE 1

Key filter properties

| Sample | W (µm) | t (µm) | t1 (µm) |
|---|---|---|---|
| 1 | 25 | 3 | 4 |
| 2 | 30 | 3.5 | 4 |
| 3 | 35 | 4 | 4.5 |
| 4 | 40 | 3 | 2 |
| 5 | 45 | 2.5 | 4 |

TABLE 1-continued

Key filter properties

| Sample | Q-factor | | Centerline (THz) | | Reflectance Minimum (dB) | |
|---|---|---|---|---|---|---|
| | Measured | Simulated | Measured | Simulated | Measured | Simulated |
| 1 | 2.8 | 2.2 | 5.0 | 4.6 | −17 | −15 |
| 2 | 2.4 | 2.2 | 3.9 | 3.8 | −16 | −13 |
| 3 | 2.2 | 2.3 | 3.4 | 3.1 | −14 | −13 |
| 4 | 3.2 | 2.9 | 2.5 | 2.4 | −10 | −8.0 |
| 5 | 2.9 | 1.9 | 1.7 | 1.7 | −8.5 | −5.4 |

As the periodicity of the metamaterial (W parameter) increases, the absorption frequency redshifts, as graphically depicted in FIG. 8. Such behavior is expected from plasmonic structures [28]. Periodic ripples in the simulated spectra, which can most clearly be seen in the reflectance plot for sample 3 (FIG. 8), are spaced evenly at ~4.5 cm$^{-1}$. Such behavior is Fabry-Perot resonances, as the dissimilar refractive index of the substrate forms an optical cavity. Spacings between successive peaks are presented in Equation 1, where n is the refractive index (~2), d is the thickness of the cavity (500 μm), and Δv is the separation of the features in wavenumbers; which attributes a nominal 5 cm$^{-1}$ spacing for said resonances. As the scanning resolution of the FTIR spectrometer was set at 8 cm$^{-1}$, these features are poorly resolved and thus are predominantly absent from the measured data.

$$\Delta v = \frac{1}{2nd} \quad \text{(Equation 1)}$$

Figure 9:
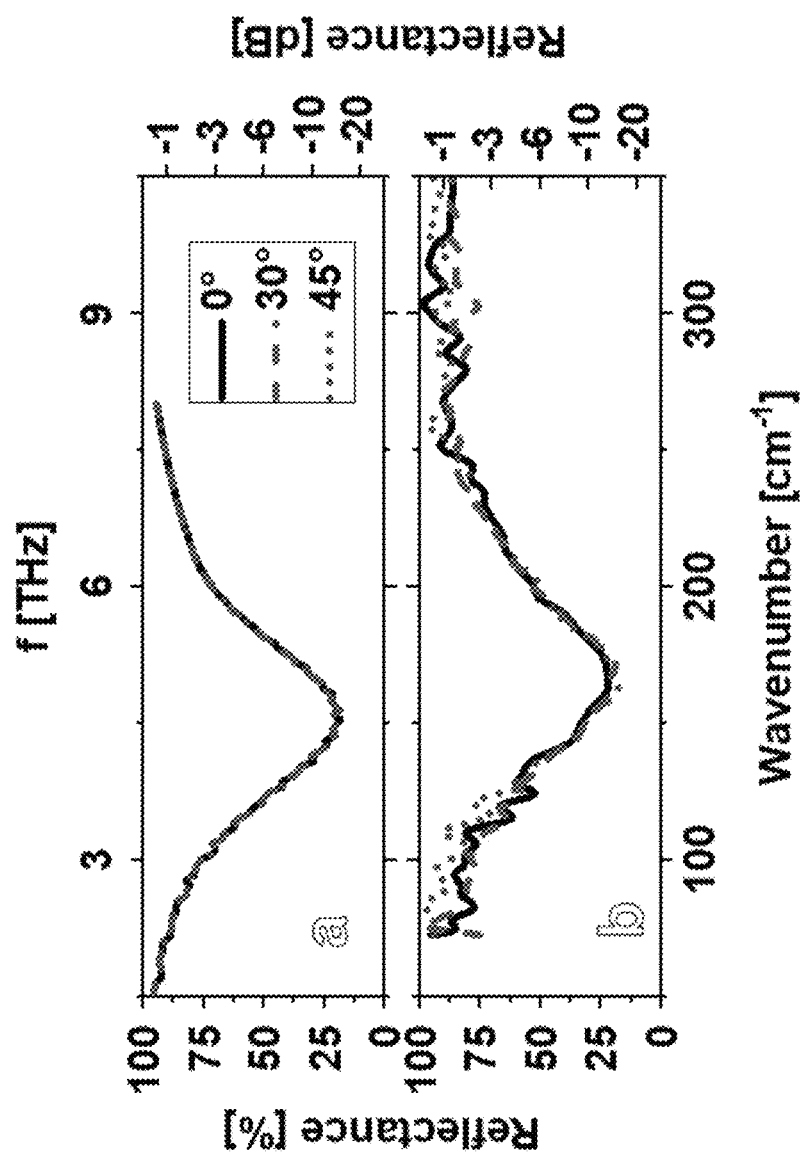
FIG. 9 graphically depicts polarization dependence results for the filter pattern of Sample 1, showing simulated results in section A and measured results in section B.

FIG. 9 graphically depicts polarization dependence for normal incidence on Sample 1 (in section A of FIG. 9) and the measured reflectance spectra for Sample 1 (in section B of FIG. 9). As shown in FIG. 9, the peak values are polarization independent, which is verified by the simulated reflectance spectrum shown in section A, where all curves coincide. In addition, as shown in section B of FIG. 9, any polarization effects are less than the ~5% experimental uncertainty for the measured reflectance spectra.

Figure 10:
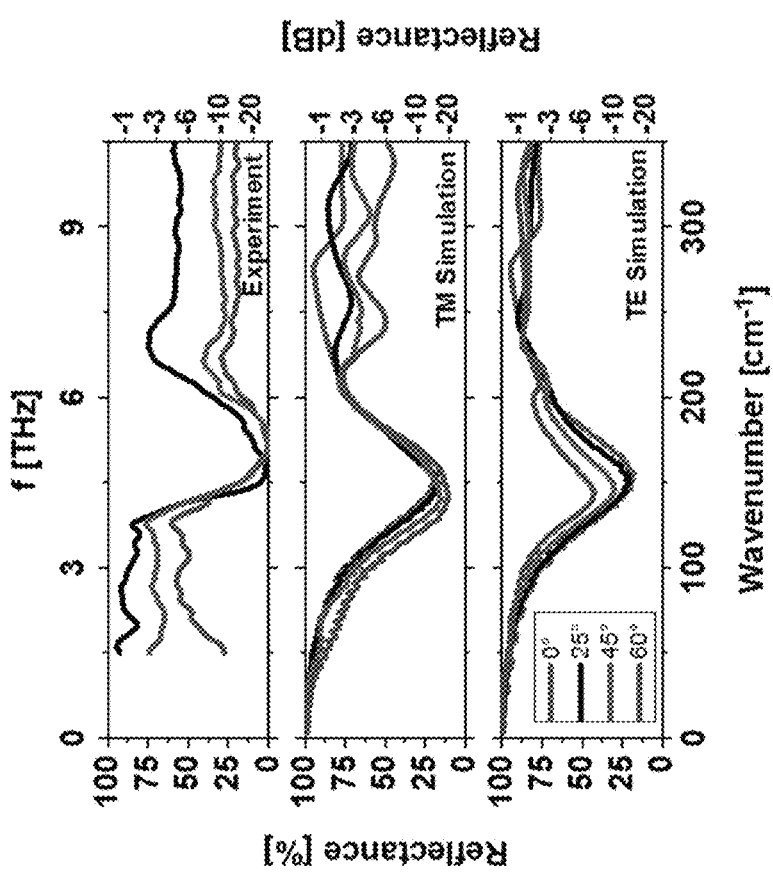
FIG. 10 graphically depicts the effects of various incidence angles on the reflectance of Sample 1, showing measured results (shown in section A), simulated transverse magnetic (TM) results (shown in section B), and simulated transverse electric (TE) results (shown in section C).

In addition, FIG. 10 shows the effects of the angle of incidence on Sample 1, showing the measured experimental data in section A, the transverse magnetic (TM) results in section B, and simulated transverse electric (TE) results in section C. As shown in FIG. 10, there are differences in behavior with increasing angles of incidence. In particular, absorption decreases for TE polarization angle increases, and both modes exhibited a small redshift. The uncertainties in the unpolarized experiment with the variable angle accessory were too large to observe these changes.

Measurements were taken at higher wavenumbers to determine if any further resonances besides those attributable to the pattern existed. A resonance was seen at 450 cm$^{-1}$ (13.5 THz) and another feature was seen at 1100 cm$^{-1}$ (33.0 THz). These line up with expected absorption features for silica [16], but with slight shifts between samples. These shifts have been explored previously by Evans et. al and further explanation can be seen therewithin [27].

The use of a metamaterial absorber layer 14 as part of a band attenuating reflecting THz filter was investigated. Measured samples produced showcased the largest FWHM observed was 56 cm$^{-1}$ (1.68 THz) with ~86% absorption at 5 THz center frequency, while the smallest FWHM observed was 20 cm$^{-1}$ (0.6 THz) with an absorption of ~61% at 1.7 THz. The absorption bands were independent on incidence angles up to 60° and were independent of polarization. Such absorbers are useful as band-blocking filters on curved surfaces such as focusing mirrors used in spectroscopy or laser applications.

Figure 11:
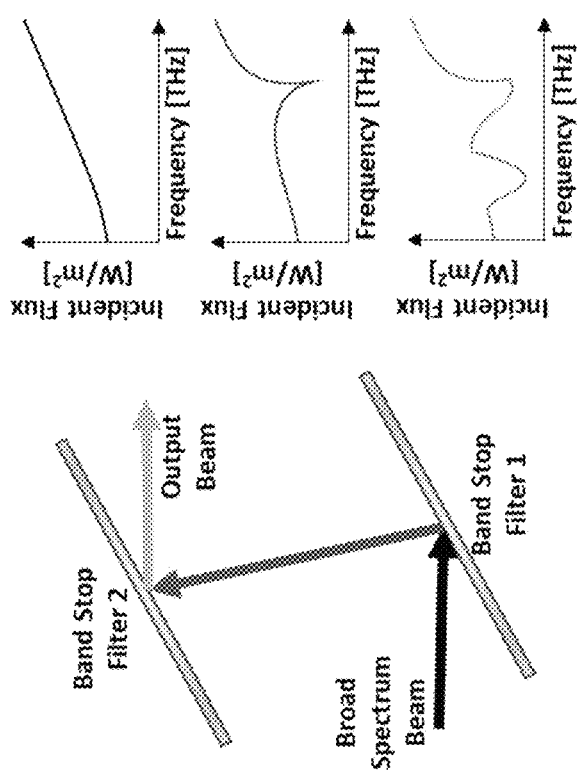
FIG. 11 depicts an embodiment of a beam path between two band stop filters, showing the incident flux as a function of frequency for each beam.

Numerous successive applications of this device may also be used such that there is the formation of a bandpass regions between two band stop regions, as exemplified in FIG. 11. The input beam with blackbody intensity is filtered by the band stop filter, the reflected beam (shown in blue) then has a missing photon packet. Upon a subsequent reflection, there is a second energy dissipation leaving the output beam (shown in green) to have a highly concentrated narrow band pass region. In a similar manner, two closely spaced band stop regions may be incorporated such that highly controlled portions of the spectrum are attenuated.

REFERENCES

[1] Jun Wang, J. G., and Weizhi Li, *Preparation of room temperature terahertz detector with lithium tantalate crystal and thin film.* AIP Advances, 2014. 4.

[2] W. D. Zhang, A. B., L. S. Himed, E. R. Brown, *Spectroscopic Sensing of Opioids in the THz Region*, in IEEE National Aerospace and Electronics Conference. 2019, IEEE: Dayton, OH.

[3] G. Ducournau, *Silicon photonics targets terahertz region.* Nature Photonics, 2018. 12(10): p. 574-575.

[4] K. R. Armstrong, F. J. L., *Far-infrared filters utilizing small particle scattering and antireflection coatings.* Applied Optics, 1974. 13(2).

[5] K. J. Leiptoldt, T. H., E. Kreysa, H. P. Gemund, *Scattering matrix methods for far-infrared metal mesh filters.* International Journal of Infrared and Millimeter Waves 1991. 12(3).

[6] R. Szipocs, A. K.-K., P. Apai, E. Finger, A. Euteneuer, M. Hofmann, *Spectral filtering of femtosecond laser pulses by interference filters.* Appl. Phys. Lett. B, 2000. 70.

[8] J. Cunningham, C. W., A. G. Davies, I. Hunter, E. H. Linfield, H. E. Beere, *Terahertz frequency range bandstop filters.* Appl. Phys. Lett., 2005. 86.

[9] D. Zhai, R. Z., Z. Geng, B. Cui, Y. Yang, *A High-Selectivity THz Band-Stop Filter Based on a Flexible Polymide Film.* SPIE, 2018. 10826.

[10] R. L. Fante and M. T. McCormack, *Reflection Properties of the Salisbury Screen.* IEEE Transactions on Antennas and Propagation, 1988. 36(10).

[11] A. N. Reddy, S. Raghavan, *Split ring resonator and its evolved structures over the past decade.* IEEE International Conference On Emerging Trends in Computing, Communication, and Nanotechnology, 2013.

[12] John H. Goldsmith, S. Vangala, Joshua R. Hendrickson, Justin W. Cleary, and Jarrett H. Vella, *Long-wave infrared selective pyroelectric detector using plasmonic near-perfect absorbers and highly oriented aluminum nitride.* J. Opt. Soc. Am., 2017. B 34: p. 1965-1970.

[13] J. Nath, S. Modak, I. Rezadad, D. Panjwani, F. Rezaie, J. W. Cleary, and R. E. Peale, *Far-infrared absorber based on standing-waveresonances in metal-dielectric-metal cavity.* Optics Express, 2015. 23(16).

[14] J. Le Perchec, R. E. Lamaestre, M. Brun, N. Rochat, O. Gravrand, G. Badano, J. Hazart, and S. Nicoletti, *High rejection bandpass optical filters based on sub-wavelength metal patch arrays.* Optics Express, 2011. 19(17).

[15] A. Derkachova, K. S., I. Demchenko, *Dielectric Function for Gold in Plasmonics Applications: Size Dependence of Plasmon Resonance Frequencies and Damping Rates for Nanospheres.* Plasmonics, 2015. 11.

[16] A. Datta, Z. Z., X. Xu, *Split ring resonator as a nanoscale optical transducer for heat-assisted magnetic recording.* Optics Express, 2019. 27.

[17] Talghader, J., Gawarikar, A. & Shea, R, *Spectral selectivity in infrared thermal detection.* Light Sci Appl, 2012. 1.

[18] Ebbesen, T., Lezec, H., Ghaemi, H. et al, *Extraordinary optical transmission through sub-wavelength hole arrays.* Nature, 1998. 391: p. 6677-669.

[19] B. Wang, L. W., G. Wang, W. Huang, X. Li and X. Zhai, *Theoretical Investigation of Broadband and Wide-Angle Terahertz Metamaterial Absorber.* IEEE Photonics Technology Letters, 2014. 26: p. 111-114.

[20] Thang Duy Dao, S. I., Takahiro Yokoyama, Tomomi Sawada, Ramu Pasupathi Sugavaneshwar, Kai Chen, Yoshiki Wada, Toshihide Nabatame, and Tadaaki Nagao, *Hole Array Perfect Absorbers for Spectrally Selective Midwavelength Infrared Pyroelectric Detectors.* ACS Publications, 2016. 3: p. 1271-1278.

[21] H. Tao, C. M. B., D. Pilon, K. Fan, A. C. Strikwerda, D. Shrekenhamer, W. J. Padilla, X. Zhang, R. D. Averitt, *A dual band terahertz metamaterial absorber.* J. Phys. D: Appl. Phys, 2010. 43.

[22] S. Ghosh and K. V. Srivastava, *Polarization-insensitive single- and broadband switchable absorber/reflector and its realization using a novel biasing technique.* IEEE Transactions on Antennas and Propagation, 2016. 64(8): p. 3665-3670.

[23] C. Arose, A. C. T., R. E. Peale, F. J. Gonzalez, Z. Loparo, J. Cetnar, S. S. Vasu, *Far-infrared spectrally selective $LiTaO_3$ and AlN pyroelectric detectors using resonant subwavelength metal surface structures.* MRS Advances, 2020. 5 (31-32).

[24] A. C. Terracciano, C. A., S. S. Vasu, *Ultra-Spectrally Selective THz Band Stop Reflector.* 2021: United States of America.

[25] A. Staykov, et al., *The stability of titania-silica interface.* International Journal of Quantum Chemistry, 2018. 118(4): p. e25495.

[26] R. Kitamura, L. P., M. Jonasz, *Optical constants of silica glass from extreme ultraviolet to far infrared at near room temperature.* Applied Optics, 2007. 46(33).

[27] R. N. Evans, S. R. C., J. R. Brescia, J. W. Cleary, E. M. Smith, R. E. Peale, *Far-infrared bands in plasmonic absorbers optimized for long-wave infrared.* MRS Advances, 2019.

[28] D. Sadrid and A. Challener, *Modern Introduction to Surface Plasmons: Theory, Mathematica Modeling, and Applications.* 2010: Cambridge university Press.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed is:

1. An ultra-spectrally selective terahertz (THz) band stop reflector configured to inhibit the reflectance of electromagnetic radiation in the THz frequency range between 0.1 THz and 10 THz, the reflector comprising:
   a substrate having a top surface opposite a bottom surface, the substrate having a thickness measured from the top surface to the bottom surface of between 10 nm and 1 mm;
   a top coating applied to the top surface of the substrate, the top coating being an absorber layer having high conductivity and including a conductive element disposed thereon, the conductive element including a conductive region that is surrounded by an absence region that is configured to enable the propagation of THz bands therethrough;
   a bottom coating applied to the bottom surface of the substrate, the bottom coating being a backplane layer having high conductivity;
   wherein the substrate, the top coating, and the bottom coating form a first layer of the reflector, further comprising a plurality of layers each including a substrate, a top coating, and a bottom coating;
   wherein a top layer of the plurality of layers includes an absence region of the top coating having a first area; and
   wherein a bottom layer of the plurality of layers includes an absence region of the top coating having a second area, the first area being greater than the second area, thereby enhancing a tuning capacity for attenuation of the THz bands therethrough.

2. The reflector of claim 1, wherein the substrate is made of a fused silica material.

3. The reflector of claim 1, wherein the substrate has a thickness of 500 μm.

4. The reflector of claim 1, wherein the backplane layer has a thickness of 100 nm.

5. The reflector of claim 1, wherein the absorber layer has a thickness of 100 nm.

6. The reflector of claim 1, wherein the absorber layer is made of a titanium/gold metamaterial.

7. The reflector of claim 1, the conductive region of the absorber layer is shaped as a cross having two perpendicularly intersecting sections that are equal in area and that each intersect at a midpoint of an opposing intersecting section.

8. The reflector of claim 7, wherein a width of each of the two perpendicularly intersecting sections is between 2 μm and 4.5 μm.

9. The reflector of claim 8, wherein a width of the defined absence region surrounding the conductive element is between 2.5 μm and 4 μum.

10. The reflector of claim 1, wherein the absorber layer includes a plurality of conductive elements disposed thereon.

11. The reflector of claim 10, wherein each conductive region of the plurality of conductive elements is shaped as a cross having two perpendicularly intersecting sections that are equal in area and that each intersect at a midpoint of an opposing intersecting section.

12. The reflector of claim 11, wherein the plurality of conductive elements are arranged in a consistent pattern, such that each of the plurality of conductive elements is spaced apart from adjacent conductive elements by an equal distance that defines a periodicity of the plurality of conductive elements.

13. The reflector of claim 12, wherein the periodicity of the plurality of conductive elements is between 25 μm and 45 μm.

14. The reflector of claim 12, wherein the consistent pattern of the plurality of conductive elements includes a cumulative area of 360 mm².

15. An ultra-spectrally selective terahertz (THz) band stop reflector configured to inhibit the reflectance of electromagnetic radiation in the THz frequency range between 0.1 THz and 10 THz, the reflector comprising:
  a substrate having a top surface opposite a bottom surface, the substrate having a thickness measured from the top surface to the bottom surface of between 10 nm and 1 mm;
  a top coating applied to the top surface of the substrate, the top coating being an absorber layer having high conductivity and including a plurality of conductive elements disposed thereon, each of the plurality of conductive elements including a conductive region that is surrounded by an absence region that is configured to enable the propagation of THz bands therethrough;
  the plurality of conductive elements arranged in a consistent pattern, such that each of the plurality of conductive elements is spaced apart from adjacent conductive elements by an equal distance that defines a periodicity of the plurality of conductive elements, the periodicity being between 25 μm and 45 μm;
  each conductive region being shaped as a cross having two perpendicularly intersecting sections that are equal in area and that each intersect at a midpoint of an opposing intersecting section, with a width of each intersecting section of each conductive region being between 2 μm and 4.5 μm, and with a width of the defined absence region surrounding the conductive region is between 2.5 μm and 4 μm;
  a bottom coating applied to the bottom surface of the substrate, the bottom coating being a backplane layer having high conductivity;
  wherein the substrate, the top coating, and the bottom coating form a first layer of the reflector, further comprising a plurality of layers each including a substrate, a top coating, and a bottom coating;
  wherein a top layer of the plurality of layers includes an absence region of the top coating having a first area; and
  wherein a bottom layer of the plurality of layers includes an absence region of the top coating having a second area, the first area being greater than the second area, thereby enhancing a tuning capacity for attenuation of the THz bands therethrough.

16. The reflector of claim 15, wherein each of the absorber layer and the backplane layer has an associated thickness of 100 nm.

17. The reflector of claim 15, wherein each of the plurality of conductive elements of the absorber layer is made of a titanium/gold metamaterial, and wherein the backplane layer is made of a titanium/gold metamaterial.

\* \* \* \* \*